March 24, 1970  F. W. WITZKE ET AL  3,503,062

DIRECT CURRENT POWER SUPPLY VOLTAGE LEVEL INDICATOR

Filed Nov. 12, 1965

INVENTORS,
FREDERICK W. WITZKE
BY THOMAS W. JOHANNSEN

ATTORNEY

United States Patent Office 3,503,062
Patented Mar. 24, 1970

3,503,062
DIRECT CURRENT POWER SUPPLY VOLTAGE LEVEL INDICATOR
Frederick W. Witzke, Ann Arbor, Mich., and Thomas W. Johannsen, Seven Hills, Ohio, assignors to The Bendix Corporation, a corporation of Delaware
Filed Nov. 12, 1965, Ser. No. 507,338
Int. Cl. G08b 21/00, 5/00; H05b 41/00
U.S. Cl. 340—249                                11 Claims

ABSTRACT OF THE DISCLOSURE

An apparatus for indicating the voltage level of a direct current source having first circuit means, including a first oscillator, connected to unitary indicating means to provide a first indication when the voltage level is satisfactory and second circuit means, including a second oscillator, connected to said indicating means to provide a second indication when the voltage level is unsatisfactory.

---

This invention relates generally to power supply condition indicators and more particularly to a pilot and warning light for battery power supplies.

Battery power supplies, including rechargeable battery power supplies are used in certain sensitive measuring instruments. As the battery discharges with use, the output voltage drops off and when it drops below a predetermined level, erroneous readings by the instrument may result. Thus it is desirable if not essential to provide a pilot light indication of satisfactory voltage output levels and to also provide a warning indication when the battery voltage reaches a level where instrument readings may be impaired.

Thus one object of the present invention is to provide an improved apparatus for effectively indicating satisfactory and unsatisfactory power supply conditions.

Further objects of the present invention are to provide a pilot and warning light indicator that is relatively inexpensive to manufacture; that is reliable; that provides different visual indications that are easily perceived; and that has a relatively small drain on the power supply.

Other objects, features and advantages of the present invention will become apparent in connection with the following description, the appended claims and the accompanying drawings in which:

Figure 1:
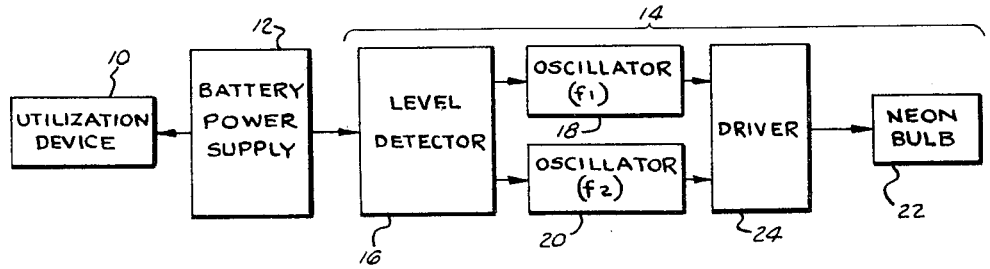
FIGURE 1 is a block diagram functionally illustrating a pilot and warning indicator of the present invention applied to a battery power supply.

Referring to the drawings in greater detail, a utilization device 10 is energized by a battery power supply 12 whose voltage output level is monitored by a pilot and warning indicator designated generally by numeral 14. The indicator 14 comprises a voltage level detector 16 which selectively controls a pair of oscillators 18, 20 in accordance with the voltage output level at the power supply 12. Oscillator 18 operates at a frequency ($f_1$) that is different from the frequency ($f_2$) of oscillator 20 and oscillators 18, 20 are arranged to energize a neon light bulb 22 through a driver circuit 24 to cause different visual indications depending on the voltage output level at power supply 12. In the preferred embodiment of the present invention, in response to voltage output levels that are satisfactory for the utilization device 10, oscillator 20 is effective to cause the bulb 22 to appear to be continuously on and thus serve as a pilot light. If the voltage output level at the power supply 12 drops to a predetermined low value that is unsatisfactory, oscillator 18 then becomes effective to cause bulb 22 to appear as a blinking light and thus serve as a warning that the output is low. Other arrangements are also contemplated to provide different indications for increases rather than decreases in the voltage output level at a power supply. Visually different blinking rates for the bulb 22 are also contemplated rather than a continuously on light and a blinking light to indicate different conditions at the power supply 12.

Figure 2:
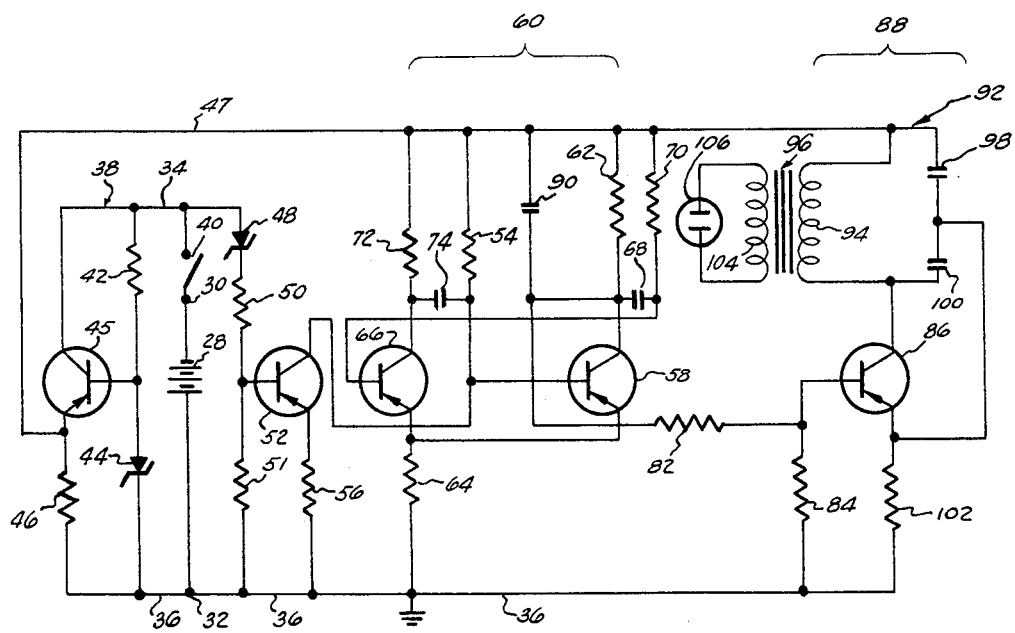
FIGURE 2 is a circuit diagram of one embodiment of a pilot and warning indicator of the present invention.

Referring to the embodiment illustrated in FIG. 2, a battery 28 has a pair of output terminals 30, 32 which are connected respectively by conductors 34, 36 to a voltage regulator indicated generally by numeral 38. A main-on-off switch 40 is connected in conductor 34 between terminal 30 and regulator 38. Regulator 38 includes a resistor 42 connected in series with a Zener diode 44 across conductors 34, 36. Diode 44 establishes a reference voltage at the base of an emitter follower transistor 45 which develops a substantially constant voltage output across its emitter resistor 46. The regulated output developed across resistor 46 corresponds to the output of power supply 12 (FIG. 1) and is connected to the utilization device 10 and the indicator 14 by conductor 36 and a second supply conductor 47. Regulator 38, although not essential to the present invention, is included in the preferred embodiment to provide a substantially constant output level for the utilization device 10 and the indicator 14. With a constant supply bulb 22 will glow at a constant brilliance during operation of the indicator 14.

Also connected to the unregulated output of battery 28 across conductors 34, 36 is a Zener diode 48 in series with a pair of resistors 50, 51 which develop a forward bias on the base of a transistor 52 when diode 48 is conducting. Diode 48 establishes a reference for unsatisfactory voltage output levels. Transistor 52 has its collector-emitter circuit connected across conductors 47, 36 through a collector load resistor 54 and an emitter bias resistor 56. The output developed across resistor 54 serves as a base input for a transistor 58 in a free running multivibrator 60. Multivibrator 60 corresponds to oscillator 18 (FIG. 1) in the preferred embodiment. The collector-emitter circuit of transistor 58 is connected across conductors 47, 36 through a collector load resistor 62 and an emitter resistor 64. The output developed across resistor 62 is coupled to a second transistor 66 in the multivibrator 60 through a coupling capacitor 68 and a charging resistor 70. Transistor 66 has its collector-emitter circuit connected across conductors 47, 36 through a collector load resistor 72 and the resistor 64. The output developed across resistor 72 is cross coupled to the base of transistor 58 by a capacitor 74 and the resistor 54 so that transistors 58, 66 operate as a conventional multivibrator oscillator.

The multivibrator output across resistor 62 is also connected through a voltage divider comprising resistors 82, 84 to the base of a transistor 86 in an oscillator 88. Oscillator 88 corresponds to oscillator 20 (FIG. 1) in the preferred embodiment. A by-pass capacitor 90 is also connected across the resistor 62. Connected in the collector output of transistor 86 is a tank circuit 92 comprising a primary winding 94 of a transformer 96 and a pair of capacitors 98, 100 connected across the primary 94. Oscillator 88 is a Colpitts type oscillator with feedback from the tank circuit 92 coupled to the emitter of transistor 86 across an emitter bias resistor 102. Transformer 96 has a secondary winding 104 connected directly across a neon bulb 106 to increase the voltage at winding 94 to a value sufficiently high to fire bulb 106.

In operation when switch 40 is closed and assuming that the charge remaining in battery 28 is sufficient to maintain a satisfactory voltage output level at terminals 30, 32, diodes 44, 48 are both conducting. With diode 44 conducting, a regulated output is supplied to conductors 36, 47. With diode 48 conducting, transistor 52 is on and the voltage drop across resistor 54 is sufficient to maintain transistor 58 off. When transistor 58 is off, transistor 86 is forward biased by the divider including resistors 62, 82, 84 and oscillator 88 oscillates at a frequency determined by the reactance of winding 94 and capacitors 98, 100. The alternating signal developed across winding 94 causes bulb 106 to fire and the oscillation frequency is selected so that bulb 106 switches on and off at a rate sufficiently high so as to appear to an observer as though the bulb were continuously on. However, as battery 28 discharges with use and when the terminal voltage across terminals 30, 32 drops to a predetermined unsatisfactory level, the break point of diode 48 is chosen so that diode 48 stops conducting to turn transistor 52 off. With transistor 52 off, transistor 58 will turn on to start multivibrator 60 into free running operation in a well known manner. During each cycle of multivibrator 60 when transistor 58 is on, the drop across resistor 62 is sufficient to turn transistor 86 off and transistor 86 will remain off until transistor 58 is turned off during the next cycle. With transistor 86 off, bulb 106 will also be off. Capacitors 68, 74 and resistors 70, 54 are selected so that the switching rate of multivibrator 60 triggers oscillator 88 on and off at a rate that causes the bulb 106 to blink at a slow rate that is perceptibly different from the continuously on appearance of bulb 106. Thus when bulb 106 is blinking it provides a warning indication that the voltage output level is unsatisfactory and battery 28 will be replaced or recharged. Should the voltage output at battery 28 drop to a level such that diode 44 in regulator 38 stops conducting, oscillators 60, 88 will both turn off and remain off to keep bulb 106 off and thus provide a third indication of the unsatisfactory output of the power supply 12. Another advantage of the embodiment illustrated in FIG. 2 is that when the power supply 12 is used with an instrument having a meter, the switching of multivibrator 60 causes the pointer of the meter to vibrate and provides a further indication to an operator that a low voltage condition exists.

Figure 3:
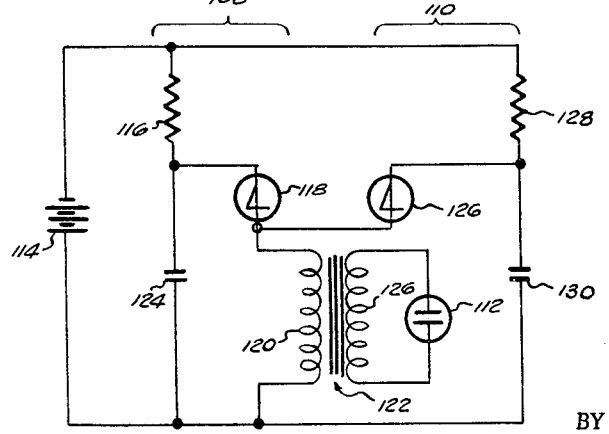
FIGURE 3 is a circuit diagram of another embodiment of the present invention.

The embodiment illustrated in FIG. 3, comprises a pair of relaxation oscillators 108, 110 which functionally correspond to oscillators 20, 18, respectively, in FIG. 1, to control the blinking rate of a neon bulb 112 and thus indicate the condition of a battery 114. Oscillator 108 comprises a resistor 116, a four layer diode 118 and a primary winding 120 of a step-up transformer 122 all of which are connected in series across battery 114. Connected across diode 118 and winding 120 is a storage capacitor 124 which is periodically discharged through winding 120 by diode 118 when oscillator 108 is on. The break point of diode 118 is chosen so that diode 118 conducts periodically and oscillator 108 is on when the voltage output level at battery 114 is satisfactory. Bulb 112 is connected across a secondary winding 126 of transformer 122 and is fired each time diode 118 conducts. In the preferred form of the embodiment illustrated in FIG. 3, resistor 116 and capacitor 124 are selected so that winding 120 is pulsed at a rate that causes bulb 112 to appear to an operator as though it were continuously on and thus serve as a pilot light. The oscillator 110 includes a second four layer diode 126 and a resistor 128 also connected in series with winding 120 across battery 114. A capacitor 130 is connected across diode 126 and winding 110. The break point of diode 126 is selected so that diode 126 can conduct at a voltage below the break point of diode 118 when the voltage output of battery 114 drops below a satisfactory level. The values of resistor 128 and capacitor 130 are selected so that capacitor 130 is discharged by diode 126 through winding 120 at a relatively slow rate that causes bulb 112 to blink and serve as a warning indication.

In operation when battery 114 is fully charged, diodes 118, 126 will both conduct periodically but the frequency of oscillator 108 is sufficiently greater than the frequency of the oscillator 110 to mask the effect of oscillator 110 and cause bulb 112 to appear to be on continuously. For example, a two cycle per second blinking rate produced by oscillator 110 would be masked by a thirty cycle per second rate produced by oscillator 108. As battery 114 discharges with use and the voltage output at battery 114 drops to an unsatisfactory level, diode 118 stops conducting while diode 126 continues to conduct periodically and oscillator 110 then becomes effective to cause bulb 112 to blink at a relatively slow rate and provide a low voltage warning. If the voltage output at battery 114 drops below the break point of diode 126, oscillators 108, 110 both remain off and bulb 112 stays off to provide a further low voltage indication. By way of example with a 12 volt battery, diode 126 may conduct at all voltages over 6 volts and diode 118 may conduct at all voltages over 10 volts.

What is claimed is:

1. Warning and pilot indicating apparatus for indicating direct current power supply conditions comprising:
   unitary indicating means for providing indications when said indicating means is energized,
   first circuit means operatively connected to said power supply and said unitary indicating means to energize said indicating means in response to one condition of said power supply with a pulsating electrical signal having a first repetition rate so as to activate said indicating means at a rate that provides a first indication representing said one condition of said power supply, said first circuit means including a first oscillator means to establish said first repetition rate, and
   second circuit means operatively connected to said power supply and to said unitary indicating means to energize said indicating means in response to a second condition of said power supply with a pulsating electrical signal having a second repetition rate so as to activate said indicating means at a rate that provides a second indication perceptively different from said first indication and representing said second condition of said power supply, said second circuit means including a second oscillator means to establish said second repetition rate.

2. The apparatus set forth in claim 1 wherein said first oscillator means has an output circuit and an input circuit, a transformer having a secondary winding connected to said indicating means and a primary winding connected in said output circuit to energize said indicating means in response to said first condition with said first signal when said first oscillator means is on, and said second oscillator means is connected in said input circuit to turn said first oscillator means on and off at a rate substantially lower than said first repetition rate in response to said second condition of said power supply.

3. The apparatus set forth in claim 2 wherein detector means are connected to said power supply and said second oscillator means, and said detector means are operative in response to a predetermined output level of said power supply to turn said second oscillator on.

4. The apparatus set forth in claim 1 wherein said first oscillator means and said second oscillator means have a common output circuit, a transformer having a primary winding connected in said output circuit to be energized by either said first oscillator means or said second oscillator means, and said transformer having a secondary winding connected to said indicating means.

5. The apparatus set forth in claim 4 wherein said first circuit means includes first detector means operative in response to said first condition of said power supply to turn said first oscillator means on and operative in responsive to said second condition to turn said first oscillator means off and said second circuit means comprises a second detector means operable in response to said second condition of said power supply to turn said second oscillator means on.

6. The apparatus set forth in claim 4 wherein said first oscillator means is a relaxation oscillator having a four layer diode connected in series with said primary winding across said power supply and operative in response to one output level of said power supply to energize said primary winding with said first signal, and wherein said second oscillator means is a second relaxation oscillator having a four layer diode connected in series with said primary winding across said power supply and operable in response to a different output level of said power supply to energize said primary winding at a second repetition rate.

7. The apparatus set forth in claim 1 wherein: said power supply has a pair of output terminals, and said apparatus further includes a voltage breakdown device connected in series with a first impedance across said output terminals to establish a first reference voltage in response to one condition of said power supply and establish a second reference voltage in response to a second condition of said power supply, a first coupling circuit connected between said voltage breakdown device and said second oscillator means, said second oscillator means comprising multivibrator means responsive to one of said reference voltages to assume a free running condition and operative in response to the other of said reference voltages to assume an off condition, second coupling circuit means connected between said multivibrator means and said first oscillator means and operative when said multivibrator means is off to turn said first oscillator means on and operative when said multivibrator means is on to turn said first oscillator means on and off at the switching rate of said multivibrator means, said multivibrator means having a switching rate substantially lower than the frequency of oscillation of said first oscillator.

8. In combination a direct current power supply, a gaseous discharge tube for providing a visual indication when said tube is energized, a transformer having a secondary winding connected to said tube, first oscillator means operatively connected to said power supply and to a primary winding of said transformer to fire said tube at a rate such that said tube appears to be continuously on when said first oscillator means is on, second oscillator means operatively connected to said first oscillator means to turn said first oscillator on when said second oscillator is off and to turn said first oscillator means on and off when said second oscillator means is on at a rate determined by the oscillation frequency of said second oscillator, and voltage level detection means connected to said power supply and said second oscillator and operative in response to a predetermined voltage output level at said power supply to turn said second oscillator on, said second oscillator having an oscillation frequency such that when said first oscillator means is turned on and off by said second oscillator means, said tube blinks.

9. Warning and pilot indicating apparatus for a direct current power supply comprising unitary indicating means operable in response to a first periodic signal to give a first visual indication and operable in response to a second and different periodic signal to give a second visual indication perceptively different from said first indication, first circuit means, including a first oscillator, connected to said direct current power supply and to said indicating means and responsive to one condition of said direct current power supply to convert a direct current from said power supply into said first periodic signal and apply said first signal to said indicating means so as to provide said first indication, and second circuit means, including a second oscillator, connected to said direct current power supply and to said indicating means and responsive to a second condition of said direct current power supply to convert a direct current from said power supply into said second periodic signal and apply said second periodic signal to said indicating means so as to provide said second visual indication.

10. The apparatus set forth in claim 1 wherein said indicating means is light bulb means.

11. Warning and pilot indicating apparatus for a direct current power supply comprising:
   indicating means operable in response to a first periodic signal to give a first indication and operable in response to a second periodic signal to give a second indication different from said first indication;
   first circuit means, including a first oscillator, operatively connected to said direct current power supply and to said indicating means so as to provide said first periodic signal to said indicating means in response to a first condition of said power supply at a first repetition rate such that said indicating means gives said first indication only when said first condition is present; and
   second circuit means, including a second oscillator, operatively connected to said direct current power supply and to said first oscillator and responsive to the voltage level at said direct current power supply such that said second oscillator turns on when the direct current power supply voltage is in a second condition in order to turn said first oscillator on and off when said second oscillator is on, at a rate determined by the repetition rate of said second oscillator, said second oscillator having a repetition rate such that when said first oscillator is turned on and off by said second oscillator, said indicating means gives said second indication.

References Cited

UNITED STATES PATENTS

| | | | |
|---|---|---|---|
| 3,395,332 | 7/1968 | Altfather. | |
| 1,856,857 | 5/1932 | Sieber | 317—51 XR |
| 1,933,976 | 11/1933 | Hanson | 317—149 XR |
| 3,188,526 | 6/1965 | Engel | 324—122 XR |

FOREIGN PATENTS 913,757  12/1962  Great Britain.

OTHER REFERENCES

Radio-Electronics; "Unijunction Pilot Lamp" by Lederer; April 1962; page 75.

JOHN W. CALDWELL, Primary Examiner

DANIEL MYER, Assistant Examiner

U.S. Cl. X.R.

307—287, 324; 331—107, 130; 340—248, 331